United States Patent
Bouazizi

(10) Patent No.: US 9,807,188 B2
(45) Date of Patent: Oct. 31, 2017

(54) METHODS AND APPARATUSES FOR DYNAMIC CONTENT OFFLOADING

(71) Applicant: Samsung Electronics Co., Ltd., Suwon-si, Gyeonggi-do (KR)

(72) Inventor: Imed Bouazizi, Plano, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/247,024

(22) Filed: Apr. 7, 2014

(65) Prior Publication Data

US 2014/0301202 A1  Oct. 9, 2014

Related U.S. Application Data

(60) Provisional application No. 61/810,099, filed on Apr. 9, 2013.

(51) Int. Cl.
*H04W 28/02* (2009.01)
*H04W 72/00* (2009.01)
*H04L 29/08* (2006.01)
*H04W 4/06* (2009.01)

(52) U.S. Cl.
CPC ...... *H04L 67/2814* (2013.01); *H04L 67/2861* (2013.01); *H04W 4/06* (2013.01); *H04L 67/06* (2013.01)

(58) Field of Classification Search
None
See application file for complete search history.

(56) References Cited

U.S. PATENT DOCUMENTS

| 6,253,271 | B1 | 6/2001 | Ram et al. |
| 9,084,105 | B2 * | 7/2015 | Luna ...................... H04W 8/24 |
| 9,213,605 | B2 * | 12/2015 | Oyman ............... G06F 11/1412 |
| 9,215,569 | B2 * | 12/2015 | Kotecha ................. H04W 4/06 |

(Continued)

FOREIGN PATENT DOCUMENTS

| KR | 2007-0086888 A | 8/2007 |
| WO | WO 2013/016189 A1 | 1/2013 |
| WO | WO 2013/022470 A1 | 2/2013 |

OTHER PUBLICATIONS

International Search Report dated Jul. 7, 2014 in connection with International Patent Application No. PCT/KR2014/003082, 4 pages.

(Continued)

*Primary Examiner* — Robert C Scheibel

(57) ABSTRACT

Methods and apparatuses for dynamic content offloading are provided. For example, a method includes sending, by a client device, a request for one or more data files and receiving a redirection message redirecting the client device to receive the one or more data files through a broadcast channel if offloading is available for the one or more data files. As another example, a method a method includes configuring a client device to utilize offloading and dynamically redirecting the client device to a broadcast channel to receive a transmission of one or more data files in response to (i) receiving a request from the client device for the one or more data files, (ii) determining that offloading to the broadcast channel is appropriate for the one or more data files, and (iii) determining that the client device is configured to utilize offloading.

20 Claims, 5 Drawing Sheets

(56) References Cited

U.S. PATENT DOCUMENTS

| | | | |
|---|---|---|---|
| 9,226,265 B2* | 12/2015 | Gupta | H04W 72/005 |
| 2006/0035644 A1 | 2/2006 | Niwano et al. | |
| 2012/0263089 A1* | 10/2012 | Gupta | H04W 72/005 |
| | | | 370/312 |
| 2013/0182643 A1* | 7/2013 | Pazos | H04L 65/4076 |
| | | | 370/328 |
| 2013/0246846 A1* | 9/2013 | Oyman | G06F 11/1412 |
| | | | 714/18 |
| 2013/0294321 A1* | 11/2013 | Wang | H04W 4/06 |
| | | | 370/312 |
| 2014/0201323 A1* | 7/2014 | Fall | H04L 67/10 |
| | | | 709/217 |
| 2014/0286225 A1* | 9/2014 | Yu | H04W 4/08 |
| | | | 370/312 |
| 2015/0131657 A1* | 5/2015 | Oyman | H04W 56/00 |
| | | | 370/390 |
| 2015/0288530 A1* | 10/2015 | Oyman | H04W 56/00 |
| | | | 370/312 |
| 2016/0014184 A1* | 1/2016 | Rehan | H04L 5/0085 |
| | | | 709/219 |

OTHER PUBLICATIONS

Written Opinion of International Searching Authority dated Jul. 7, 2014 in connection with International Patent Application No. PCT/KR2014/003082, 7 pages.

3GPP TS 26.346 V11.2.0; "Multimedia Broadcast/Multicast Service (MBMS) Protocols and Codecs"; Release 11; Sep. 2012; 159 pages.

European Patent Office, "Supplementary European Search Report," European Application No. 14783376.8-1853, Nov. 17, 2016, 6 pages, publisher EPO, Munich, Germany, place of search The Hague.

* cited by examiner

METHODS AND APPARATUSES FOR DYNAMIC CONTENT OFFLOADING

CROSS-REFERENCE TO RELATED APPLICATION AND CLAIM OF PRIORITY

This application claims priority under 35 U.S.C. §119(e) to U.S. Provisional Patent Application No. 61/810,099 filed on Apr. 9, 2013. The above-identified provisional patent application is hereby incorporated by reference in its entirety.

TECHNICAL FIELD

This disclosure is generally directed to wireless data transmission. More specifically, this disclosure is directed to methods and apparatuses for dynamic content offloading.

BACKGROUND

Recently, applications executed by client devices in mobile wireless networks have substantially increased the data traffic through the mobile networks. These types of applications can require relatively large amounts of data to be transmitted to or from a client device, such as video data. By increasing the data traffic, these applications can affect mobile operators and the dimensioning of core networks. As the mobile data traffic increases, new challenges can arise, and important network trade-offs may be required.

SUMMARY

This disclosure provides methods and apparatuses for dynamic content offloading.

In a first example, a client device configured to utilize offloading includes at least one processing device configured to send a request for one or more data files. The client device also includes at least one interface configured to receive a redirection message redirecting the client device to receive the one or more data files through a broadcast channel if offloading is available for the one or more data files.

In a second example, a method includes sending, by a client device, a request for one or more data files. The method also includes receiving a redirection message redirecting the client device to receive the one or more data files through a broadcast channel if offloading is available for the one or more data files.

In a third example, a server includes at least one processing device configured to configure a client device to utilize offloading. The at least one processing device is also configured to dynamically redirect the client device to a broadcast channel to receive a transmission of one or more data files in response to (i) receiving a request from the client device for the one or more data files, (ii) determining that offloading to the broadcast channel is appropriate for the one or more data files, and (iii) determining that the client device is configured to utilize offloading.

In a fourth example, a method includes configuring a client device to utilize offloading. The method also includes dynamically redirecting the client device to a broadcast channel to receive a transmission of one or more data files in response to (i) receiving a request from the client device for the one or more data files, (ii) determining that offloading to the broadcast channel is appropriate for the one or more data files, and (iii) determining that the client device is configured to utilize offloading.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention can be implemented in any suitable manner and in any type of suitably arranged device or system.

Figure 1:
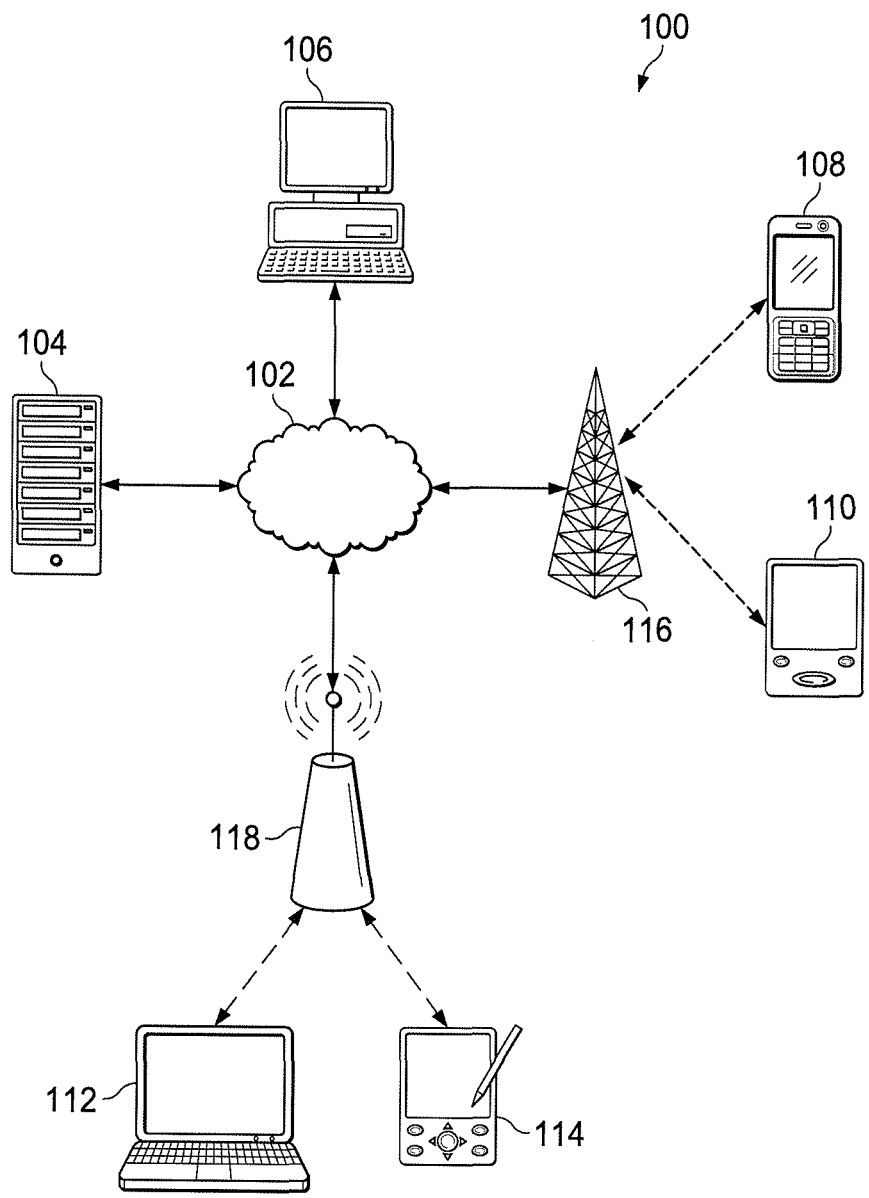
FIG. 1 illustrates an example system supporting dynamic content offloading according to this disclosure.

FIG. 1 illustrates an example system 100 supporting dynamic content offloading according to this disclosure. The embodiment of the system 100 shown in FIG. 1 is for illustration only. Other embodiments of the system 100 could be used without departing from the scope of this disclosure.

As shown in FIG. 1, the system 100 includes a network 102, which is configured to facilitate communication between various components in the system 100. For example, the network 102 can be configured to communicate Internet Protocol (IP) packets, frame relay frames, Asynchronous Transfer Mode (ATM) cells, or other information between network addresses. The network 102 can include one or more local area networks (LANs), metropolitan area networks (MANs), wide area networks (WANs), all or a portion of a global network such as the Internet, or any other communication system or systems at one or more locations.

The network 102 is configured to facilitate communications between at least one server 104 and various client devices 106-114. Each server 104 can include any suitable computing or processing device(s) that provide computing services for one or more client devices. Each server 104 can, for example, include one or more processing devices, one or more memories storing instructions and data, and one or more network interfaces configured to facilitate communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices can be used in the system 100.

In this example, some client devices 108-114 can be configured to communicate indirectly with the network 102. For example, the client devices 108-110 can be configured to communicate via one or more base stations 116, such as cellular base stations or eNodeBs. Also, the client devices 112-114 can be configured to communicate via one or more wireless access points 118, such as IEEE 802.11 wireless access points. Note that these direct and indirect communication mediums are for illustration purposes only. As such, each client device can be configured to communicate directly with the network 102 or indirectly with the network 102 via any suitable intermediate device(s) or network(s).

As described in more detail below, one or more components of the system 100 can be configured to dynamically redirect traffic to a broadcast channel, such as for traffic offloading to a Multimedia Broadcast/Multicast System (MBMS). Among other things, this can help to reduce the amount of data traffic through the network 102 since the broadcast channel can be received by multiple client devices (rather than requiring transmissions of the same content of each individual client device).

Although FIG. 1 illustrates one example of a system 100 supporting dynamic content offloading, various changes can be made to FIG. 1. For example, the system 100 can include any number of each component in any suitable arrangement. In general, computing and communication systems can come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
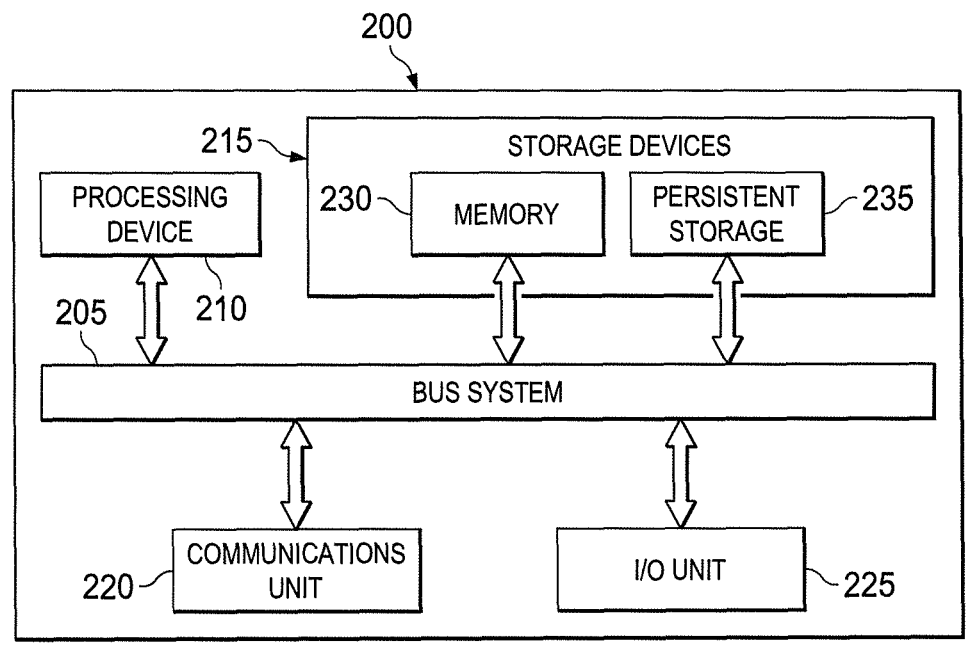
FIGS. 2 and 3 illustrate example devices in a system supporting dynamic content offloading according to this disclosure.
Figure 3:
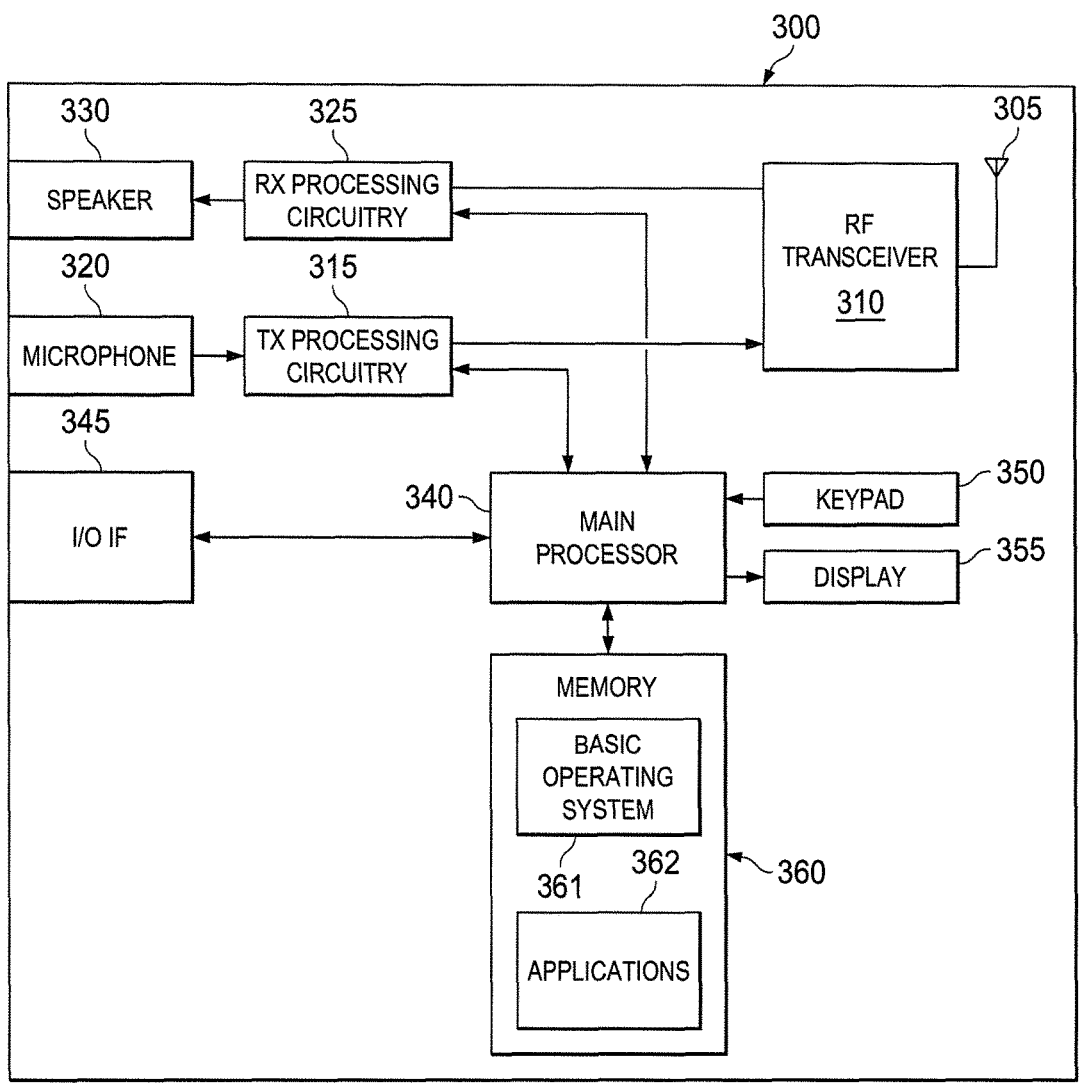

FIGS. 2 and 3 illustrate example devices in a system supporting dynamic content offloading according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which is configured to support communication between at least one processing device 210, at least one storage device 215, at least one communications unit 220, and at least one input/output (I/O) unit 225.

The processing device 210 is configured to execute instructions that may be loaded into a memory 230. The server 200 can include any suitable number(s) and type(s) of processing devices 210 in any suitable arrangement. Example processing devices 210 can include microprocessors, microcontrollers, digital signal processors, field programmable gate arrays, application specific integrated circuits, and discrete circuitry. The processing device(s) 210 is configured to execute processes and programs resident in the memory 230, such as operations for dynamically redirecting traffic to a broadcast channel.

The memory 230 and a persistent storage 235 are examples of storage devices 215, which represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc. In some embodiments, the memory 230 can include at least one cache memory.

The communications unit 220 is configured to support communications with other systems or devices. For example, the communications unit 220 can include a network interface card or a wireless transceiver facilitating communications over the network 102. The communications unit 220 is configured to support communications through any suitable physical or wireless communication link(s).

The I/O unit 225 is configured to allow for input and output of data. For example, the I/O unit 225 can be configured to provide a connection for user input through a keyboard, mouse, keypad, touchscreen, or other suitable input device. The I/O unit 225 can also be configured to send output to a display, printer, or other suitable output device.

Note that while FIG. 2 is described as representing the server 104 of FIG. 1, the same or similar structure can be used in one or more of the client devices 106-114. For example, a laptop or desktop computer can have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 can include a basic operating system (OS) program 361 and one or more applications 362.

The RF transceiver 310 is configured to receive, from the antenna 305, an incoming RF signal transmitted by another component in a system. The RF transceiver 310 is configured to down-convert the incoming RF signal to generate an intermediate frequency (IF) or baseband signal. The IF or baseband signal can be sent to the RX processing circuitry 325, which can generate a processed baseband signal by filtering, decoding, or digitizing the baseband or IF signal. The RX processing circuitry 325 is configured to transmit the processed baseband signal to the speaker 330 (such as for voice data) or to the main processor 340 for further processing (such as for web browsing data).

The TX processing circuitry 315 is configured to receive analog or digital voice data from the microphone 320 or other outgoing baseband data (such as web data, e-mail, or interactive video game data) from the main processor 340. The TX processing circuitry 315 is configured to encode, multiplex, or digitize the outgoing baseband data to generate a processed baseband or IF signal. The RF transceiver 310 is configured to receive the outgoing processed baseband or IF signal from the TX processing circuitry 315 and to up-convert the baseband or IF signal to an RF signal that is transmitted via the antenna 305.

The main processor 340 can include one or more processors or other processing devices and is configured to execute the basic OS program 361 stored in the memory 360 in order to control the overall operation of the client device 300. For example, the main processor 340 can be configured to control the reception of forward channel signals and the transmission of reverse channel signals by the RF transceiver 310, the RX processing circuitry 325, and the TX processing circuitry 315 in accordance with well-known principles. In some embodiments, the main processor 340 can include at least one microprocessor or microcontroller.

The main processor 340 is also configured to execute other processes and programs resident in the memory 360, such as operations for dynamically redirecting traffic to a broadcast channel. The main processor 340 can also be configured to verify if one or more particular data files are not stored in a memory 360, such as a cache memory, before transmitting a request for the one or more data files. The main processor 340 is further configured to move data into or out of the memory 360 as required by an executing process. In some embodiments, the main processor 340 can be configured to execute the applications 362 based on the OS program 361 or in response to signals received from external devices or an operator. The main processor 340 can also be coupled to the I/O interface 345, which can provide the client device 300 with the ability to connect to other devices such as laptop computers and handheld computers. The I/O interface 345 can be the communication path between these accessories and the main processor 340.

The main processor 340 can also be coupled to the keypad 350 and the display unit 355. The operator of the client device 300 can use the keypad 350 to enter data into the client device 300. The display 355 can be a liquid crystal display or other display configured to render text or at least limited graphics, such as from web sites. Note that if the display 355 represents a touchscreen display, fewer or no physical keys (such as the keypad 350) may be needed in the client device 300.

The memory 360 can be coupled to the main processor 340. Part of the memory 360 can also include a random access memory, and another part of the memory 360 can include a Flash memory or other read-only memory. In some embodiments, the memory 360 can include at least one cache memory.

As described in more detail below, the server 200 and the client device 300 can be configured to perform functions that dynamically redirect traffic to a broadcast channel, such as for traffic offloading to an MBMS.

Although FIGS. 2 and 3 illustrate examples of devices in a system supporting dynamic content offloading, various changes can be made to FIGS. 2 and 3. For example, various components in FIGS. 2 and 3 can be combined, further subdivided, or omitted and additional components can be added according to particular needs. As a particular example, the main processor 340 can be divided into multiple processors, such as one or more central processing units (CPUs) and one or more graphics processing units (GPUs). Also, while FIG. 3 illustrates the client device 300 configured as a mobile telephone or smartphone, client devices can be configured to operate as other types of mobile or stationary devices. In addition, as with computing and communication networks, client devices and servers can come in a wide variety of configurations, and FIGS. 2 and 3 do not limit this disclosure to any particular client device or server.

As noted above, applications for client devices have substantially increased the data traffic sent over a network, and important network trade-offs may be needed as data traffic increases. For example, as data traffic increases, new techniques may be needed to optimize network capacity and appropriately dimension the network.

In accordance with this disclosure, an MBMS is utilized for traffic offloading, which can help to optimize network capacity and appropriately dimension the network. The MBMS can provide a broadcast service for targeting a wide range of receivers in a spectrally-efficient manner. An MBMS in an LTE system (eMBMS) can be based on a Single Frequency Network (SFN) technology, which relies on the broadcast of the same signal across a whole SFN area. In order to enable traffic offloading to an MBMS, this disclosure provides devices and techniques for redirecting mobile data (such as video content) to a broadcast channel (such as a broadcast channel for delivering video content) in a dynamic manner. Additionally, the largest share of mobile data traffic is often HTTP-based. Thus, in particular embodiments, this disclosure provides devices and techniques that handle HTTP data traffic using, for example, a file delivery method to deliver offloaded content. Additionally, this disclosure provides devices and techniques that handle Real-Time Streaming Protocol (RTSP) traffic using, for example a streaming method to deliver offloaded content.

It should be understood that a broadcast channel can include a channel for mobile data traffic associated with one or more particular types of mobile data (such as mobile video, mobile audio, HTTP mobile data, or the like). A broadcast channel could also include a channel for mobile data traffic associated with one or more particular electronic files (such as a specific mobile video file, a specific mobile audio file, mobile data from a particular HTTP source, or the like). A broadcast channel could further include a channel for broadcasting one or more particular applications that utilize mobile video traffic, mobile audio traffic, or the like. The reoccurring use of broadcast channels can be referred to as a data transmission session or a broadcast session (hereinafter a "data transmission session").

In accordance with this disclosure, traffic offloading can be performed either as a client device-elected procedure or by initially distributing content as MBMS services even if the broadcast channel has not yet been activated. With client device-elected offloading, the client device can inform a server (such as the server 200) that it will be ready to switch to MBMS reception when, for example, the requested content becomes available over a broadcast channel. The server can be configured to pre-configure the client device with the details of the MBMS service (such as an on-demand MBMS service). The details can include the location of the user service descriptor (USD), the type of traffic for which offloading is offered, and the proxy server over which content requests have been sent. As such, when a server determines that offloading may be useful or is appropriate, the server can offload a piece of content or a data transmission session to the MBMS service by redirecting the client device, such as through an HTTP or RTSP redirection message. The redirection message can include a uniform resource locator (URL) to launch the MBMS receiver, such as a URL to the USD.

A client device that is not able to handle the redirection message of the server appropriately may not use the proxy server for requests. Thus, an increased startup delay can develop because the availability of the requested resources may not be immediate.

In some embodiments, in order for a client device to differentiate between a regular redirection request and an offloading request, a new header field can be defined. The MBMS offloading header field could apply to both RTSP and HTTP redirections. If the client device detects the presence of the MBMS offloading header, it can assume that this is an offloading request to an MBMS session. The MBMS offloading header field can also contain the URL to the MBMS USD that describes the MBMS session. The client device can check if the USD URL corresponds to a USD that has already been downloaded; if not, it can use HTTP to fetch the USD.

Figure 4:
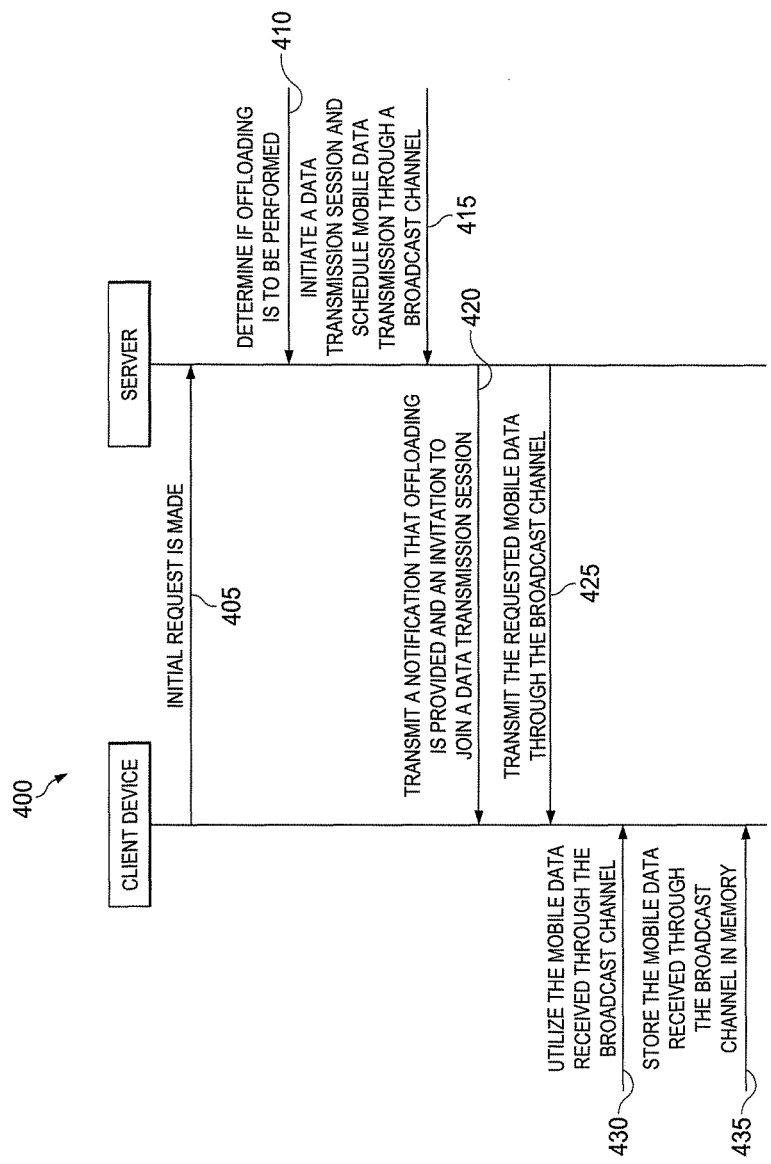
FIG. 4 illustrates example signaling for dynamic content offloading according to this disclosure.

FIG. 4 illustrates example signaling 400 for dynamic content offloading according to this disclosure. As shown in FIG. 4, a client device (such as the client device 300) makes an initial request 405 to a server (such as the server 200) for one or more data files. After receiving the request 405, the server inspects the request and makes a determination 410 if offloading is to be performed. In some embodiments, the server can determine if offloading is provided for specific content or a particular set of content pieces.

After the server determines that offloading is provided for the requested data, the server performs an initiation 420 of a data transmission session and schedules the transmission of the requested data through a broadcast channel. The server also sends one or more messages 420 notifying the client device that offloading is provided or appropriate and inviting the client device to join the data transmission session. The server also performs one or more transmissions 425 of the requested data to the client device through the broadcast channel. In some embodiments, the server can be configured to transmit the notification and the invitation along with the requested data to the client device so that the client device joins the data transmission session in response to receiving the requested data.

After receiving the data, the client device utilizes 430 the requested data. For example, in the case of video data, the client device can be configured to play or display a video segment derived from the video data.

In some embodiments, after the client device receives the data, the client device can be configured to store 435 the received data in a memory, such as a cache memory, of the client device. By storing the data in a memory of the client device, the client device does not have to make a subsequent request to the server for previously-requested data. Thus, in some embodiments, the client device can be configured to inspect its memory in order to determine if data to be requested is already stored in its memory before transmitting a request to the server. If the data to be requested is already stored in the memory of the client device, the client device can be configured to abstain from transmitting the request and subsequently utilize the stored data. Conversely, if the client device fails to detect that the data to be requested is stored in its memory or determines that the data to be requested is not stored in its memory, the client device can be configured to transmit the request in order to receive the data. By storing data in a memory of the client device after receiving the data from the server, data traffic can be reduced by limiting the number of transmission occurrence of the same data.

Additionally, in some embodiments, the initial request 405 by the client device for data can be transmitted over a unicast transmission. However, after the client device is notified that offloading is provided and invited to join the data transmission session, subsequent requests (such as those requesting the same or similar electronic files or the same of similar types of mobile data) can be redirected for transmission through the broadcast channel. As a result, after the client device is notified that offloading to a broadcast channel is provided, the client device can join a data transmission session. Subsequent data requests can be redirected to the data transmission session, and the client device can receive the content over a broadcast channel.

In some embodiments, a mobile network operator can utilize the Open Mobile Alliance (OMA) Device Management (DM) protocol to configure a client device to make use of offloading. For example, a mobile network operator can configure one or more proxy servers for offloading so that client devices can transmit requests for mobile data to the proxy servers. In particular embodiments, client device requests can be limited to particular services (such as video files, audio files, or the like), or the client device requests can be applicable to all HTTP traffic. When transmitting client device requests to a signaled proxy server, the client devices can be prepared for redirections to a data transmission session. The redirection can occur during an MBMS session, the redirection can be pre-configured by a mobile network operator, or the redirection can occur in any other suitable manner.

Although FIG. 4 illustrates one example of the signaling 400 for dynamic content offloading, various changes may be made to FIG. 4. For example, the caching of data at the client device need not occur. Also, various signals can be combined, further subdivided, or omitted and additional signals can be added according to particular needs.

Figure 5:
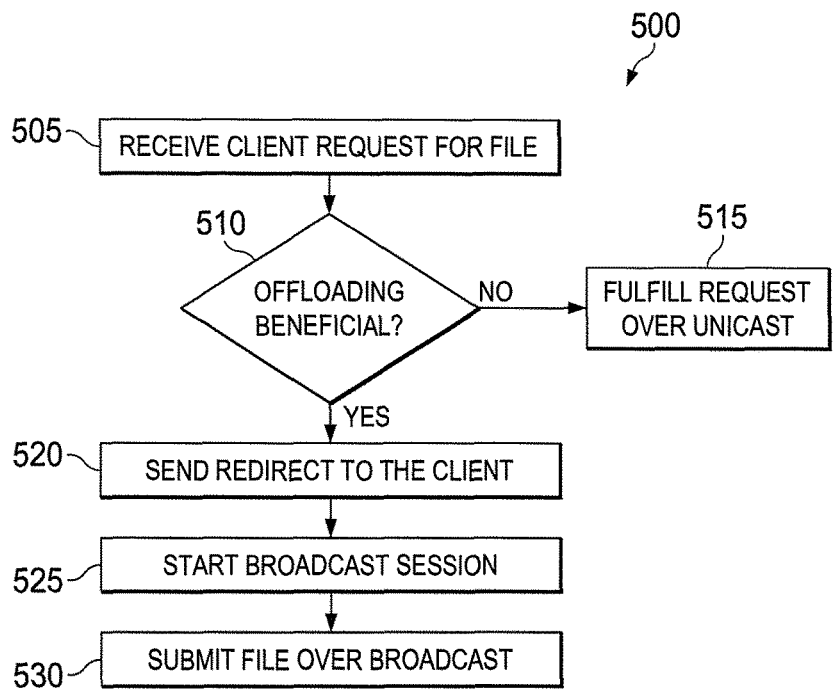
FIG. 5 illustrates an example method for dynamic content offloading at a server according to this disclosure.

FIG. 5 illustrates an example method 500 for dynamic content offloading at a server according to this disclosure. As shown in FIG. 5, the server receives a client request for at least one file at step 505. The server determines if offloading is beneficial at step 510. If the server determines that offloading is not beneficial, the server fulfills the client device's request over a unicast transmission at step 515. If the server determines that offloading is beneficial, the server sends a redirection instruction to the client device at step 520, initiates a data transmission session at step 525, and transmits or submits the at least one requested file over a broadcast channel at step 530.

Figure 6:
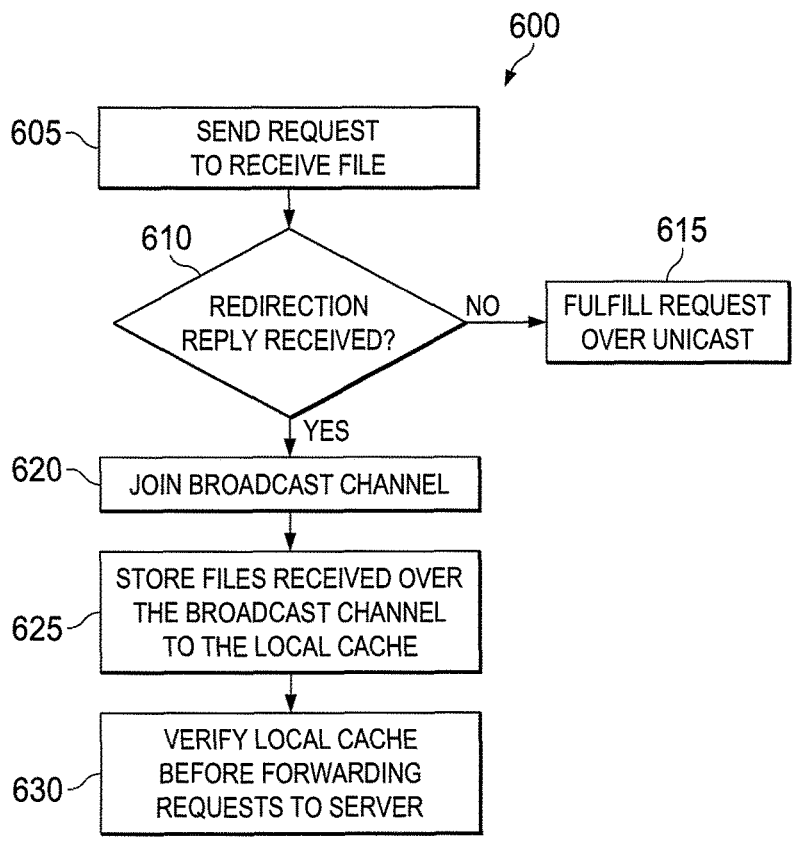
FIG. 6 illustrates an example method for dynamic content offloading at a client device according to this disclosure.

FIG. 6 illustrates an example method 600 for dynamic content offloading at a client device according to this disclosure. As shown in FIG. 6, the client device sends a request for at least one file to a server at step 605. The client device determines if a redirection reply is received from the server at step 610. If not, the client device receives the requested file(s) and fulfills the request over a unicast transmission at step 615. Otherwise, the client device joins a data transmission session at step 620 and receives and stores (such as in a cache memory) one or more files over the broadcast channel at step 625. Later, the client device verifies if a particular file is stored in its cache before transmitting a subsequent request for that particular file to the server at step 630.

Although FIGS. 5 and 6 illustrate examples of methods for dynamic content offloading, various changes may be made to FIGS. 5 and 6. For example, while each figure shows a series of steps, various steps in each figure could overlap, occur in parallel, or occur any number of times.

Figure 7:
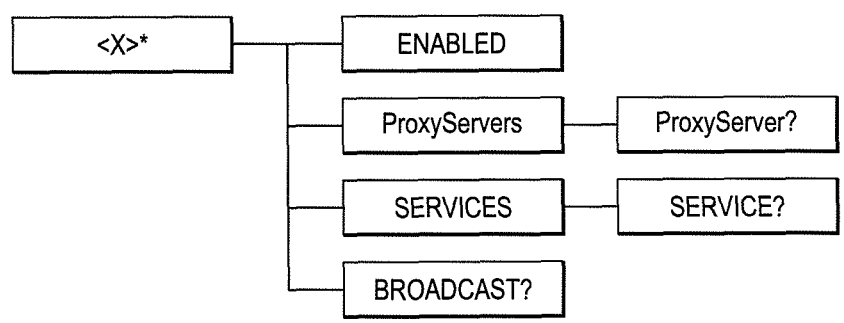
FIG. 7 illustrates an example of Device Management (DM) Object offloading according to this disclosure.

FIG. 7 illustrates an example of DM Management Object (MO) offloading according to this disclosure. In some embodiments, a client device can use MO offloading to determine if offloading is to be used or which proxy server is to be used. For example, a server can be configured to use an HTTP redirection mechanism to indicate that a requested resource (such as one or more data files) is or has been moved temporarily to another location. The server can also include the information used to access a broadcast service in the body of the redirection message. As a particular example, the information to access the broadcast service can be contained in an MBMS User Service Descriptor (USD). In other embodiments, a proxy server can be configured to keep track of request statistics. For example, a proxy server can be configured to keep statistics in order to decide if a specific resource is requested frequently enough that transmission of the specific resource can be more efficiently delivered over a broadcast channel. For instance, a proxy server can be configured to determine popular or related files and schedule their transmission over a broadcast channel. In some embodiments, a leaf provides a list of traffic filters for which the server is willing to offer offloading. A client that supports offloading to the MBMS can verify the filter for every request and, if at least one of the filters matches, send the request using the HTTP proxy. The matching could first compare the traffic class and then the domain name if it exists.

In still other embodiments, a server can be configured to inform receivers (such as client devices) of an upcoming data transmission session that delivers files to be cached by the client devices for potential future use by the receivers.

Although FIG. 7 illustrates one example of DM MO offloading, various changes may be made to FIG. 7. For example, any other suitable technique can be used to identify content to be offloaded, and any other redirection mechanism can be supported.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A client device, the client device comprising:
at least one memory;
at least one processor operably connected to the at least one memory, the at least one processor configured to:
receive, from a server, a configuration to utilize content offloading using an open mobile alliance device management (OMA DM) message; and
based on the configuration, determine whether to send a request to a proxy server for the content offloading, or not for one or more data files; and
at least one interface configured to receive a redirection message during a multimedia broadcast multicast service (MBMS) session, the redirection message redirecting the client device to receive the one or more data files based on the received configuration through a broadcast channel if the content offloading is available for the one or more data files, wherein a transmission channel for the one or more data files is different from a transmission channel of the redirection message.

2. The client device of claim 1, wherein the at least one interface is further configured to:
receive the one or more data files through a unicast channel if the content offloading is not available for the one or more data files; and
receive the one or more data files through the broadcast channel if the content offloading is available for the one or more data files.

3. The client device of claim 1, wherein the at least one processor is further configured to:
store the one or more data files in the at least one memory in response to receiving the one or more data files through the broadcast channel; and
verify whether the one or more data files are stored in the at least one memory before sending the request.

4. The client device of claim 1, wherein:
the at least one interface is further configured to transmit the request through a proxy server using a unicast channel, the request indicating that the client device is prepared for redirection; and
the at least one processor is further configured to select the proxy server after configuration of the client device to utilize the content offloading.

5. The client device of claim 1, wherein to determine whether to send the request is determined based on at least one of contents, time, a content source, or domain name.

6. A method comprising:
receiving configuration to utilize content offloading using an open mobile alliance device management (OMA DM) message;
based on the configuration, determining whether to send, by a client device, a request to a proxy server for the content offloading, or not for one or more data files; and
receiving a redirection message during a multimedia broadcast multicast service (MBMS) session, the redirection message redirecting the client device to receive the one or more data files based on the received configuration through a broadcast channel if the content offloading is available for the one or more data files, wherein a transmission channel for the one or more data files is different from a transmission channel of the redirection message.

7. The method of claim 6, further comprising:
receiving the one or more data files through a unicast channel if the content offloading is not available for the one or more data files; and
receiving the one or more data files through the broadcast channel if the content offloading is available for the one or more data files.

8. The method of claim 6, further comprising:
storing the one or more data files in response to receiving the one or more data files through the broadcast channel; and
verifying whether the one or more data files are stored before sending the request.

9. The method of claim 6, further comprising:
sending the request through a proxy server using a unicast channel, the request indicating that the client device is prepared for redirection; and
selecting the proxy server by the client device after configuration of the client device to utilize the content offloading.

10. The method of claim 6, wherein determining whether to send the request is determined based on at least one of contents, time, a content source, or domain name.

11. A server comprising:
at least one processor configured to:
transmit, to a client device, a configuration to utilize content offloading using an open mobile alliance device management (OMA DM) message; and
transmit, to the client device, a redirection message during a multimedia broadcast multicast service (MBMS) session; and
dynamically redirect content to the client device being served in the MBMS session over a broadcast channel to receive one or more data files included in the content based on the transmitted configuration in response to:
receive a request from the client device for the one or more data files;
determine that the content offloading to the broadcast channel is appropriate for the one or more data files; and
determine that the client device is configured to utilize the content offloading, wherein a transmission channel for the one or more data files is different from a transmission channel of the redirection message.

12. The server of claim 11, wherein the at least one processor is further configured to:
initiate a data transmission session to utilize the content offloading by the client device; and
dynamically redirect the client device to the broadcast channel to receive the one or more data files.

13. The server of claim 11, wherein the at least one processor is further configured to receive, from the client device, the request for the one or more data files through a proxy server.

14. The server of claim 11, wherein the at least one processor is further configured to:
initiate a data transmission session to utilize the content offloading by the client device; and
receive, from the client device, the request through a unicast channel.

15. The server of claim 11, wherein the at least one processor is further configured to configure the client device using open mobile alliance device management (OMS DM).

16. A method comprising:
transmitting, to a client device, a configuration to utilize content offloading using an open mobile alliance device management (OMA DM) message; and
transmitting, to the client device, a redirection message during a multimedia broadcast multicast service (MBMS) session; and
dynamically redirecting content to the client device being served in the MBMS session over a broadcast channel to receive one or more data files included in the content based on the transmitted configuration in response to:
receive a request from the client device for the one or more data files;
determine that the content offloading to the broadcast channel is appropriate for the one or more data files; and
determine that the client device is configured to utilize the content offloading, wherein a transmission channel for the one or more data files is different from a transmission channel of the redirection message.

17. The method of claim 16, further comprising:
initiating a data transmission session to utilize the content offloading by the client device, and
dynamically redirecting the client device to the broadcast channel to receive the one or more data files.

18. The method of claim 16, further comprising receiving, from the client device, the request for the one or more data files through a proxy server.

19. The method of claim 16, further comprising:
initiating a data transmission session to utilize the content offloading by the client device; and
receiving, from the client device, the request through a unicast channel.

20. The method of claim 16, further comprising configuring the client device using open mobile alliance device management.

* * * * *